UNITED STATES PATENT OFFICE.

AUGUSTE FERNBACH, OF PARIS, FRANCE, AND EDWARD HALFORD STRANGE, OF LONDON, ENGLAND.

MANUFACTURE AND PRODUCTION OF A NUTRIENT MEDIUM FOR USE IN FERMENTATION PROCESSES.

1,044,447.  Specification of Letters Patent.  Patented Nov. 12, 1912.

No Drawing. Original application filed September 24, 1912, Serial No. 722,120. Divided and this application filed October 10, 1912. Serial No. 724,990.

*To all whom it may concern:*

Be it known that we, AUGUSTE FERNBACH, a citizen of the Republic of France, of 26 Rue Dutot, Paris, in the Republic of France, D. Sc., bacteriologist, and EDWARD HALFORD STRANGE, a subject of the King of Great Britain and Ireland, of 7 Staple Inn, London, England, M. Sc., technical research chemist, have invented new and useful Improvements in the Manufacture and Production of a Nutrient Medium for Use in Fermentation Processes, of which the following is a specification.

The object of our invention is to manufacture a nutrient medium for use in fermentation processes, the said medium enabling fermentation to be carried on in a very economical and efficient manner, and with a good yield.

The present application is a division of our copending application, Serial No. 722,120, filed September 24, 1912, for fermentation process for the production of acetone.

According to our invention we make the nutrient medium by degrading yeast by means of heat and a watery medium, that is to say, either by means of steam, or by means of water heated under pressure.

The following is an example of the way in which our invention can be performed, but we do not limit ourselves to this example. 100 lbs. of pressed yeast and 1,000 lbs. of water are subjected to a temperature of about 150° centigrade for 24 hours, or until a sufficient proportion of the nitrogenous matter of the yeast has been converted into a form not capable of being precipitated by tannin. Acids, or alkalis, may be added to facilitate the conversion, but any acid, or alkali, remaining at the end of the treatment must then be neutralized.

What we claim is—

1. The process of preparing a nutrient medium for use in a fermentation process which consists in mixing water and yeast and subjecting the mixture to heat until substantially 90% of the nitrogenous matter of the yeast has been converted into a form not capable of being precipitated by tannin.

2. The process of preparing a nutrient medium for use in a fermentation process which consists in mixing water and yeast and subjecting the mixture to heat in the presence of a substance facilitating the conversion of the nitrogenous matter of the yeast into a form not capable of being precipitated by tannin.

3. The process of preparing a nutrient medium for use in a fermentation process which consists in mixing water and yeast and subjecting the mixture to heat in the presence of a substance facilitating the conversion of the nitrogenous matter of the yeast into a form not capable of being precipitated by tannin and neutralizing the product after substantially 90% of the nitrogenous matter of the yeast has been so converted.

In testimony whereof we have signed our names to this specification in the presence of two subscribing witnesses.

AUGUSTE FERNBACH.
EDWARD HALFORD STRANGE.

Witnesses:
LUCIEN MEMMINGER,
JACK G. BAKER.